United States Patent [19]
Peng

[11] Patent Number: 5,384,453
[45] Date of Patent: Jan. 24, 1995

[54] BAR CODE SCANNER WITH A SCANNING PATTERN DIVIDER

[75] Inventor: Ke- Ou Peng, Delft, Netherlands

[73] Assignee: Opticon Sensors Europe BV, Hoofddorp, Netherlands

[21] Appl. No.: 25,987

[22] Filed: Mar. 3, 1993

[30] Foreign Application Priority Data

Mar. 6, 1992 [EP] European Pat. Off. ............ 92200662

[51] Int. Cl.6 ............................................. G06K 7/10
[52] U.S. Cl. .................... 235/467; 235/457; 235/472
[58] Field of Search ................... 235/457, 467, 472

[56] References Cited

U.S. PATENT DOCUMENTS

| | | | |
|---|---|---|---|
| 4,794,237 | 12/1988 | Ferrante | 235/457 |
| 4,795,224 | 1/1989 | Goto | 350/6.3 |
| 4,870,274 | 9/1989 | Hebert et al. | 250/236 |
| 4,939,356 | 7/1990 | Rando et al. | 235/467 |
| 4,999,482 | 3/1991 | Yang | 235/457 |
| 5,064,258 | 11/1991 | Inokuchi | 235/457 |

FOREIGN PATENT DOCUMENTS

| | | |
|---|---|---|
| 424096 | 4/1991 | European Pat. Off. |
| 431831 | 6/1991 | European Pat. Off. |

Primary Examiner—Harold Pitts
Attorney, Agent, or Firm—Parmelee, Bollinger & Bramblett

[57] ABSTRACT

A bar code scanner, comprising a scanning pattern generator for deflecting a laser beam produced by a laser source so as to generate a scanning pattern in a scanning plane, further comprises a pattern divider for intercepting and dividing at least part of the pattern generated by the pattern generator into at least two divisional patterns and for projecting the divisional patterns in a scanning plane so as to form an altered scanning pattern. Preferably, at least some divisional patterns projected in the scanning plane overlap.

12 Claims, 10 Drawing Sheets

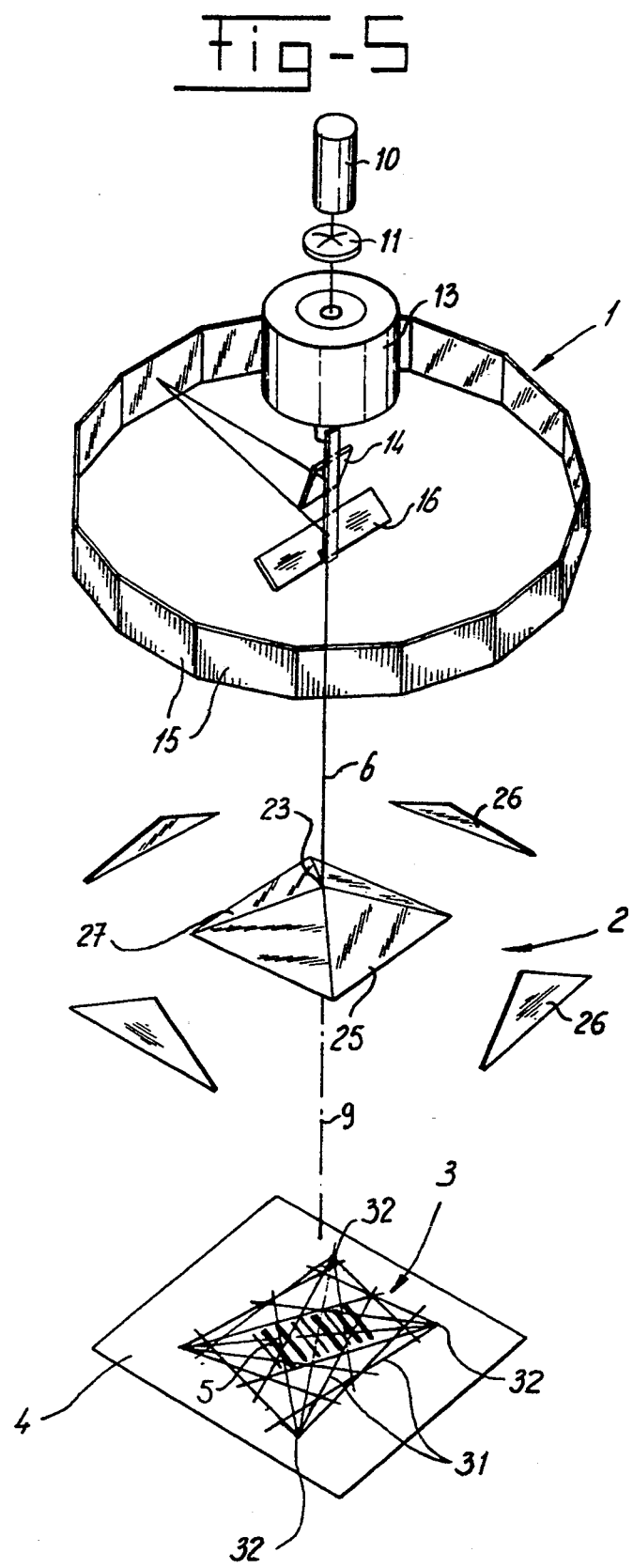

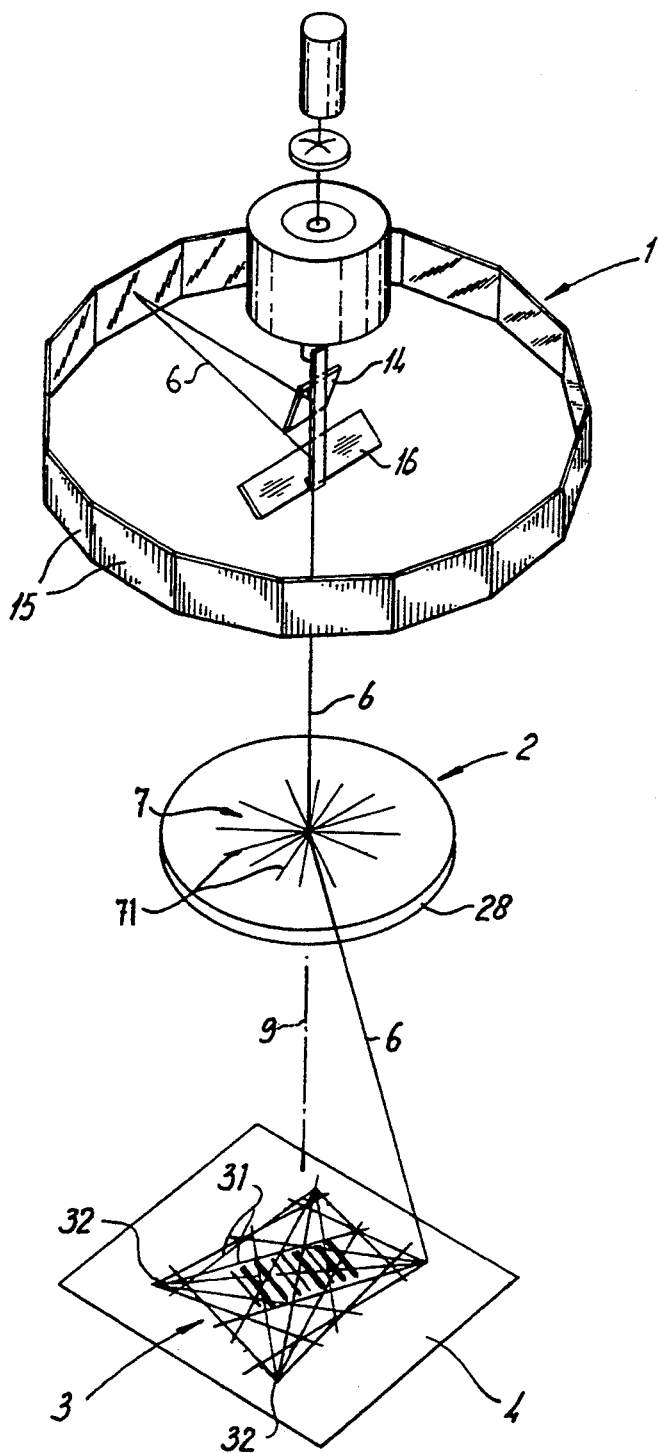

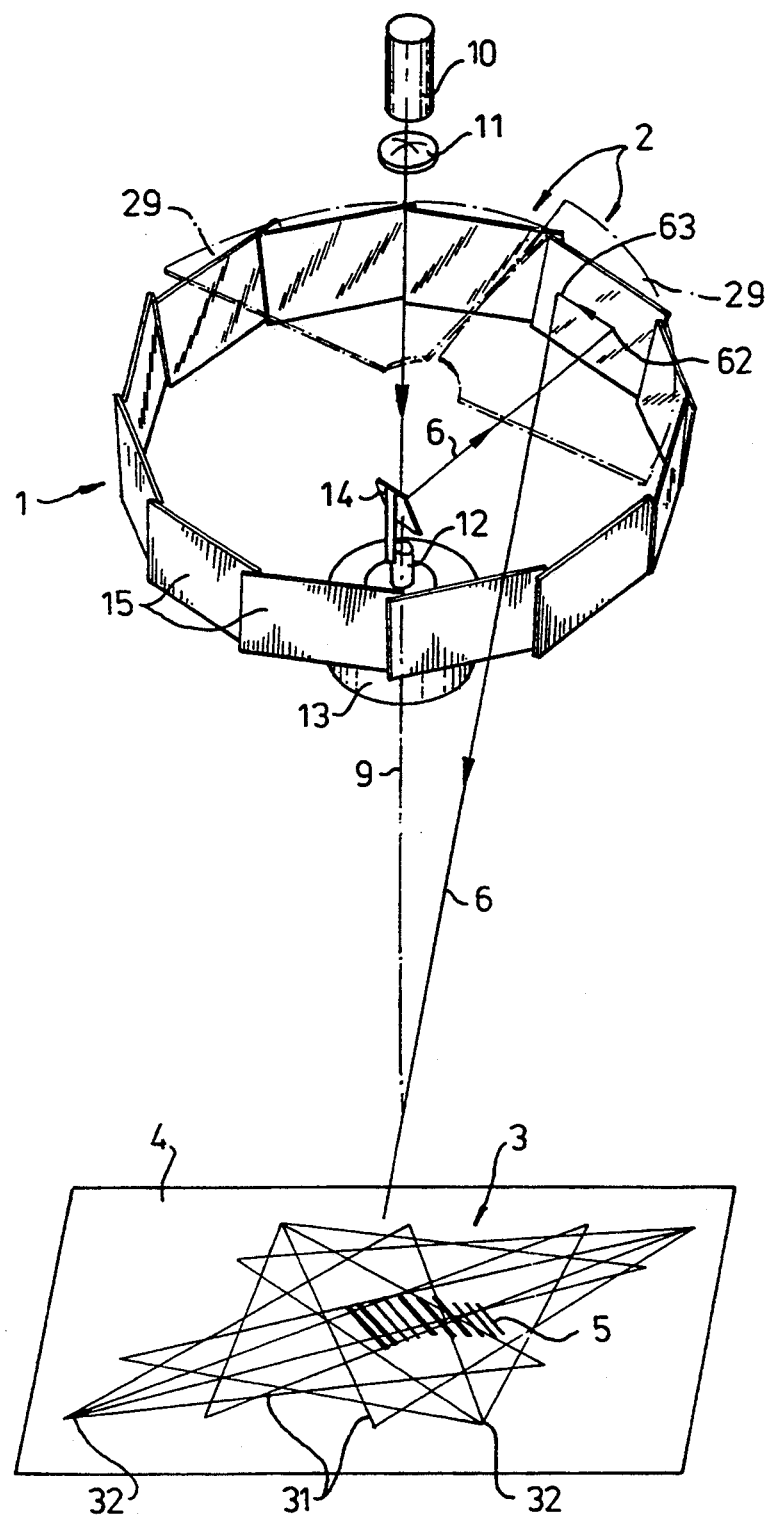

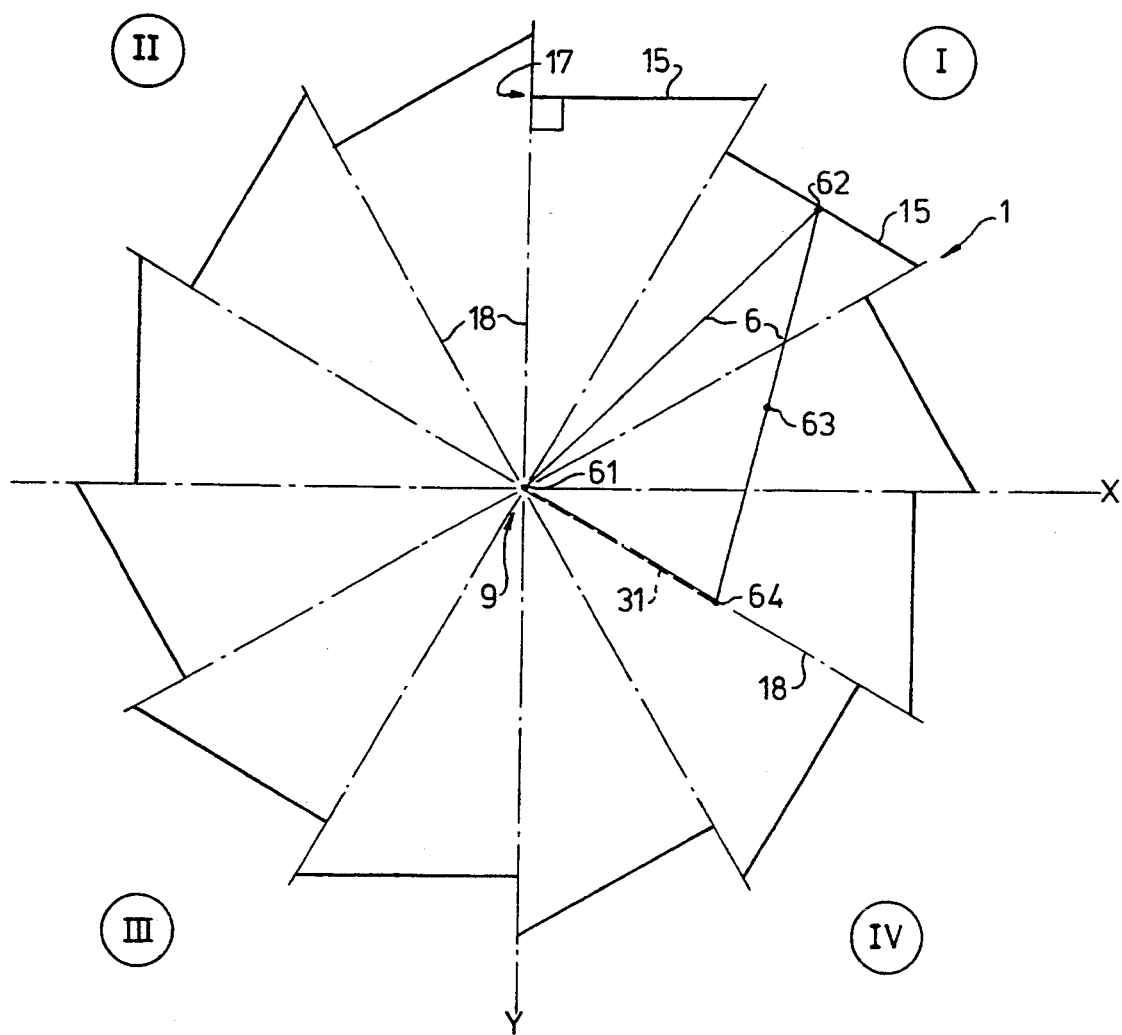

BAR CODE SCANNER WITH A SCANNING PATTERN DIVIDER

BACKGROUND OF THE INVENTION

The invention relates to a bar code scanner comprising a scanning pattern generator for deflecting a laser beam produced by a laser source so as to generate a scanning pattern in a scanning plane. Such a bar code scanner is disclosed in e.g. U.S. Pat. No. 4,669,447.

The known bar code scanner is provided with a scanning pattern generator consisting of a generally annular array of tilted mirrors and a centrally located rotatable mirror for directing the laser beam towards the mirrors of the array. With such an arrangement, several different scanning patterns can be generated, such as a star-shaped pattern. The particular pattern generated by this known arrangement depends i.a. on the angle of the tilted mirrors relative to the rotatable mirror and the number of mirrors.

For scanning bar codes, it is generally preferred to have a scanning pattern consisting of a number of substantially straight scanning lines, the lines being arranged in the plane of the bar code in such a way that the pattern has an optimal chance of containing at least one scanning line which intersects all bars of the code and which will therefore allow the code to be read. The star-shaped scanning pattern, also called the asterisk scanning pattern, provides a good scanning capability because of the many different orientations of the scanning lines, especially at or near their point of convergence. The convergence of the scanning lines of this pattern on a single point provides a great density of scanning lines in the area surrounding the point of convergence, thereby further improving the scanning capability of the pattern and therefore of the scanner employing that pattern.

Although the star-shaped scanning pattern has a number of advantageous properties, it has the disadvantage that the density of the scanning lines decreases with the distance from the point of convergence. That is, in areas of the scanning plane relative distant from the center of the scanning pattern there are relatively few scanning lines. This leads to a decreased chance of successfully reading the bar code if it is not centered relative to the scanning pattern. As in practice the center of the scanning pattern will seldom coincide with that of the bar code, the capability of the scanner to successfully read the bar code will depend on relatively small variations in the position of the bar code on the scanning plane.

SUMMARY OF THE INVENTION

An object of the invention is to provide a bar code scanner producing an improved scanning pattern enabling the scanner to read bar codes with a considerably greater chance of success, thus making the relative position of the bar code on the scanning plane less critical.

Another object of the invention is to provide a scanning pattern optimizer which can be used in conjunction with existing bar code scanners with little or no need to modify those scanners.

The bar code scanner according to the present invention is therefore characterized in that the scanner further comprises a pattern divider for intercepting and dividing at least part of the pattern generated by the pattern generator into at least two divisional patterns and for projecting the divisional patterns in a scanning plane so as to form an altered scanning pattern, and that at least some divisional patterns projected in the scanning plane overlap.

By dividing the scanning pattern into a number of divisional patterns and subsequently projecting the divisional patterns into the scanning plane, the scanning lines of the original scanning pattern, that is the scanning pattern generated and projected by the scanning pattern generator, are rearranged and/or split up into several parts. In the scanning plane, i.e. the plane in which the bar code to be scanned will be located, the divisional scanning patterns formed by the rearranged scanning lines are the constituents of the altered and thus improved scanning pattern. These divisional or constituent patterns can comprise a single line, a number of lines or the complete original scanning pattern, depending on the particular scanning pattern generator or divider used.

As the pattern divider according to the invention divides, rearranges and projects onto the scanning plane the pattern generated by the scanning pattern generator, it is of course possible to equip existing scanning pattern generators with a pattern divider so as to produce a bar code scanner according to the invention. As will be explained in more detail below, pattern dividers can be compact and simple in structure, thus not complicating or enlarging the scanner in any significant way.

In the scanner according to the invention, the overlap of at least some of the divisional patterns results in an increased mean density of the scanning lines. This, in turn, leads to an increased chance of successfully reading the bar code. It is, however, not necessary for the divisional patterns to overlap. Thus, a bar code scanner could be realized having non-overlapping divisional patterns.

Preferably, the scanner is arranged for producing a scanning pattern consisting of scanning lines converging on a common area. This allows an advantageous improved pattern to be produced by the pattern divider, the improved pattern also containing converging scanning lines. An example of a scanning pattern consisting of scanning lines converging on a common area is the star-shaped or asterisk-shaped scanning pattern. However, other patterns of which the lines do not necessarily meet in a (single) point may also be employed. The pattern can of course also be made up of only a few or even a single continuous line folding back onto itself, such as a Lissajous pattern. For producing such a pattern, the pattern generator may comprise two rotating wedges (prisms) or mirrors.

In a preferred embodiment of the invention, the pattern generator is arranged for producing divisional patterns comprising scanning lines converging upon points located peripherically relative to the altered scanning pattern. That is, the pattern divider, in conjunction with the pattern generator, produces an altered and improved pattern of which some of the constituent patterns consist of converging lines. To compensate for the fact that the star-shaped or similar pattern has a radially decreasing density, the points of convergence of at least some of the lines making up the divisional or constituent patterns can be located outside the center of the scanning pattern. The points of convergence may be located within the scanning pattern, in which case the individual converging lines meet in those points. However, it is also possible to design a scanning pattern in which the points of convergence are located outside the pattern, meaning that the converging lines do not actually meet in those points. Each substantially fan-shaped set of converging lines provides a relatively high density of scanning lines near its point of convergence. Preferably, a number of fan-shaped divisional patterns is combined with at least one star-shaped pattern, the fan-shaped divisional patterns having their points of convergence arranged around the star-shaped pattern.

Preferably, the pattern divider is arranged for dividing the pattern at a point on which the scanning lines converge. In the case of a star-shaped pattern, the pattern will preferably be divided at the center of the star. This dividing at the point of convergence is advantageous in that it provides an easy and convenient way to produce divisional patterns having converging lines, the point of convergence in most instances being retained in the divisional patterns. Moreover, a star-shaped scanning pattern, when divided at its center, may produce a number of fan-shaped divisional patterns which can be combined to form a desired optimized pattern.

In U.S. Pat. No. 4,795,224 a bar code scanner is disclosed, the scanner being provided with a pattern generator comprising an array of tilted mirrors, a rotating mirror centrally arranged in the array and a rotating prism ring arranged around the mirror. The prism ring forms an integral part of the pattern generator, the angles of diffraction of the prisms being tuned to the angles of the mirrors so as to generate the desired pattern. This known arrangement does, however, not disclose a pattern divider which can be used in combination with an existing scanner, nor does it produce patterns consisting of a plurality of fan-shaped constituent patterns.

There are several ways the scanning pattern divider according to the invention can be realized. According to a first embodiment of the invention, the pattern divider comprises a prism. Preferably, the prism has a substantially flat base surface. In this way, each side face or facet of the prism will reproduce a part of the original scanning pattern, which may be projected on the prism's base. The number of divisional scanning patterns produced in this way and their particular shape will depend on the number of side faces of the prism and their respective angles relative to the base. Preferably, the prism is pyramid-shaped, having four faces. It will be understood that a prism having a different number of side faces, e.g. three, five, six or eight faces, may also be employed.

If the pattern generator produces a star-shaped scanning pattern, this star can easily be incorporated in the improved pattern when the prism is flat-topped. That is, the prism comprises, opposite its base, a face through which the greater part of the star-shaped pattern is projected onto the scanning plane. In such an arrangement, only the edges of the star could be divided by the other faces of the prism so as to produce additional scanning lines which are not part of the original pattern.

According to a second embodiment of the invention, the pattern divider comprises an array of deflectors. The array of deflectors may comprise a polygon having reflective sides, the polygon being surrounded by mirrors. The reflective sides of the polygon deflect the incident laser beam away from the center of the scanning pattern, assuming that the scanning pattern is centered with the polygon, and the laser beam is subsequently directed towards the scanning plane by the mirrors. This arrangement is relatively simple and compact. The number of mirrors is preferably equal to the number of reflective sides of the polygon, each mirror being positioned substantially opposite a reflective side. The polygon can have three, four or more reflective sides, depending on the particular scanning pattern desired.

According to a third embodiment of the invention, the pattern divider comprises a hologram. With a hologram, a great variety of different dividers can be provided, the angle of diffraction of the laser beam incident upon the hologram being dependent on its recording geometry. Compared with a prism or a mirror array, a hologram has the advantage of generally being lighter and more compact.

In a further embodiment of the present invention, the pattern generator comprises a substantially polygonal first array of mirrors, while the pattern divider comprises a second array of mirrors, the mirrors of the second array being tilted over at least one angle relative to a common plane parallel with the polygon. The second array of mirrors should be positioned in such a way that the scanning pattern generated by the pattern generator is reflected towards the scanning plane while producing an appropriate pattern. As the pattern produced by the scanner as a whole depends on the pattern produced by the pattern generator, the generator may be adapted to the divider so as to produce the desired pattern. Preferably, the mirrors of the first array are substantially perpendicular to and have one edge located on the respective radius of the array. The first array therefore has mirrors which are each on only one side tangent to the circumference of the approximately circle-shaped array. That is, the neighbouring edges of adjacent mirrors do not touch but leave a gap. This gap is due to the fact that the edge of the mirror which is not tangent to the circle extends beyond the diameter of this circle. This arrangement allows fan-shaped divisional patterns to be produced.

BRIEF DESCRIPTION OF THE DRAWINGS

The invention will further be explained under reference to the accompanying drawings, in which:

FIG. 5 shows a second embodiment of a bar code scanner according to the invention in which the pattern divider comprises a set of deflectors.

FIG. 6 shows a third embodiment of a bar code scanner according to the invention in which the pattern divider comprises a hologram.

FIG. 8 shows a fifth embodiment of a bar code scanner according to the invention in which the pattern divider also comprises a set of deflectors cooperating with a modified scanning pattern generator.

FIG. 9 shows schematically in plan view the configuration of the mirror array of the pattern generator shown in FIG. 8.

DETAILED DESCRIPTION OF THE EMBODIMENTS

Figure 1:
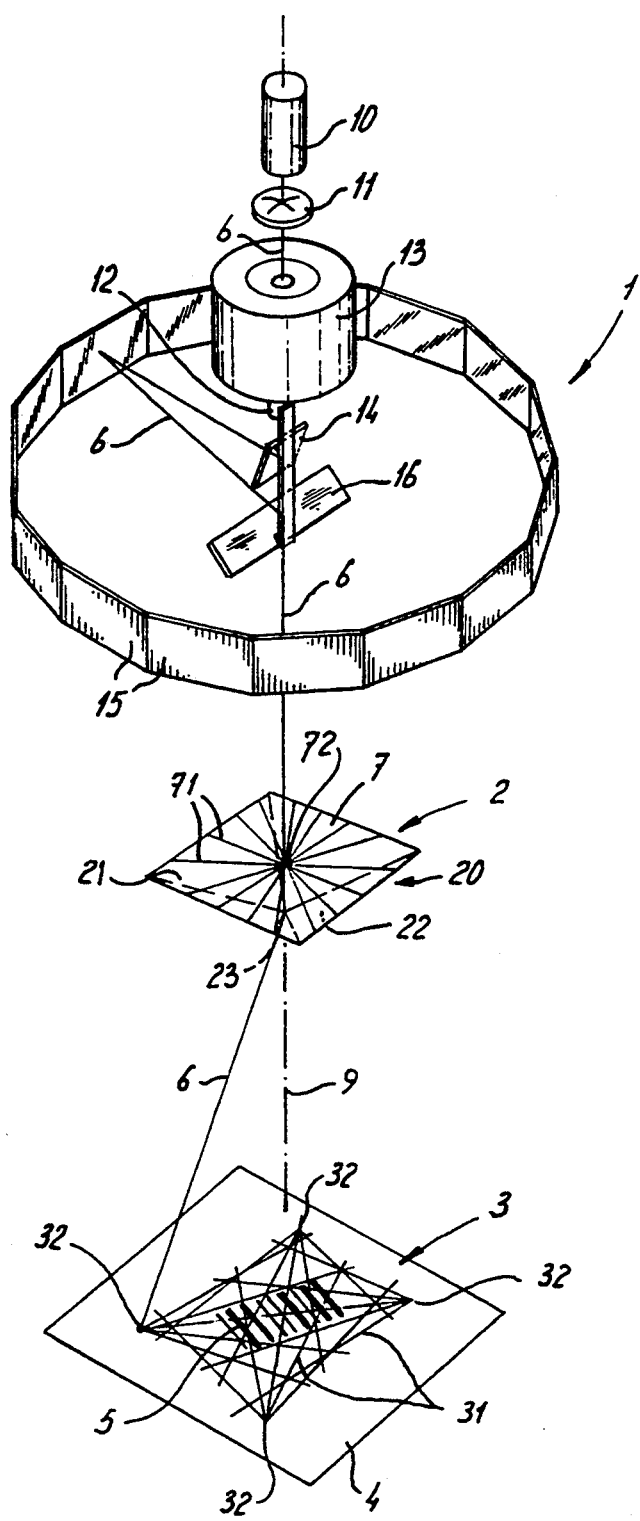
FIG. 1 shows in perspective a first embodiment of a bar code scanner according to the invention.

The bar code scanner according to the invention comprises, as illustrated in FIG. 1, a scanning pattern generator 1 and a scanning pattern divider 2. In combination, the generator 1 and the divider 2 produce a scanning pattern 3 in the scanning plane 4. A bar code 5 to be read is located in the scanning plane 4. The bar code scanner may further comprise a detector and associated signal processing means (not shown) for detecting light backscattered from the bar code 5 and for decoding the bar code 5 by means of the detected light, respectively.

The scanning pattern generator 1 illustrated in FIG. 1 comprises a laser source 10, e.g. a diode laser, for producing a laser beam 6. The laser beam 6 is focused by first focusing means 11, e.g. a single lens or a set of lenses, and is subsequently passed through the hollow shaft 12 of drive means 13. Here the laser beam 6 substantially coincides with the rotational axis 9. A mirror 14 is mechanically connected with the hollow shaft 12. This mirror 14 deflects the laser beam passing through the shaft 12 towards the substantially annular array of mirrors 15. The beam reflected by a mirror 15 is subsequently deflected by a mirror 16 towards the scanning plane 4, the mirror 16 also being mechanically connected with the hollow shaft 12. During operation, the drive means 13, which preferably comprise an electric motor, rotate the shaft 12 together with the mirrors 14 and 16. This causes the laser beam 6 to sweep across the mirrors 15 and the beam reflected by the mirrors 15 to sweep across the mirror 16. The locus of the laser beam 6 produces scanning lines in a suitable plane, e.g. the scanning plane 4. As in the illustrated embodiment the pattern divider 2 is arranged between the pattern generator 1 and the plane 4, the generator 1 will produce a first (original) scanning pattern 7 on the surface of the divider 2. The illustrated original scanning pattern 7 is a star-shaped pattern consisting of lines 71 converging on and intersecting in a point of convergence 72. It will be understood that pattern generators producing first patterns having another shape can also be used in conjunction with the pattern divider according to the invention, as will be explained below with reference to FIG. 7.

The pattern divider shown in FIG. 1 is constituted by a prism 20 having a base 21 and four sides or faces 22, the faces 22 converging in an apex 23. The laser beam 6, whose locus on the base 21 of the prism 20 constitutes the scanning lines 71 of the (original) pattern 7, will be deflected depending on its angle of incidence upon the base 21. In the embodiment shown, the axis of rotation of the shaft 12, i.e. the rotational axis 9, is perpendicular to the base 21 of the prism 20. Because of this, the laser beam 6 will be deflected only slightly upon incidence on the base 21 but will be almost completely deflected upon intersecting the faces 22. Also, the axis of rotation 9 intersects the apex 23 of the prism 20, which results in the point of convergence 72 being axially aligned with the apex 23. The laser beam 6, which for the sake of clarity of the illustration is rendered only in the position in which it coincides with the rotational axis 9, will be deflected sideways by the divider 2, one quarter of the pattern 7 being deflected by each face 22. It will be understood that the laser beam 6, which is only shown to extend from the apex 23 of the prism 20 to one of the points 32 on the scanning plane 4, may be incident on all points 32 almost simultaneously and will move during operation of the scanner so as to produce the scanning lines 31. This deflection will result in a second or altered scanning pattern 3 in the plane 4, the second pattern 3 consisting of four divisional patterns. Each divisional pattern is made up of a number of lines 31 converging in a local point of convergence 32, each point 32 being a projection of the point 72. As can be seen in FIG. 1, the local points of convergence 32 are located out of the center of the second scanning pattern 3, that is peripherically with respect to the scanning pattern 3.

Other scanning pattern generators than the one shown in FIG. 1 may be used in conjunction with its pattern divider, such as a scanning pattern generator comprising a rotating and/or stationary polygon or set of mirrors or a scanning pattern generator comprising holograms. A scanning pattern generator comprising rotating wedges will be described with reference to FIG. 7.

Figure 2A:
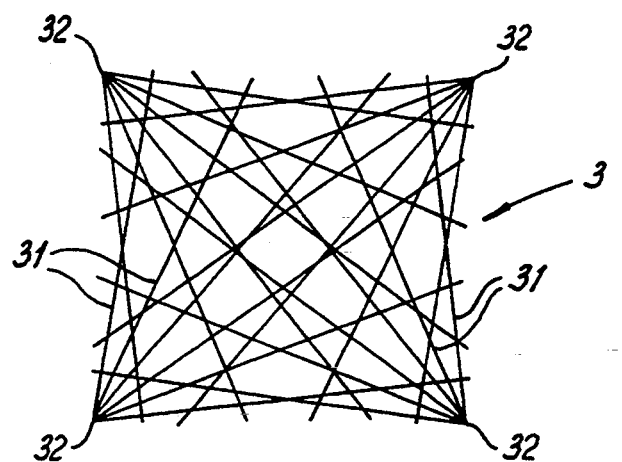
FIG. 2a and 2b show an example of a scanning pattern of the bar code scanner according to the invention and a prism used in the pattern divider to produce this pattern.
Figure 2B:
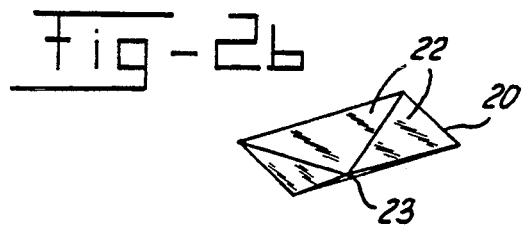

FIG. 2a shows in top view the scanning pattern 3 of FIG. 1. As this scanning pattern 3 is produced by means of a pattern divider 2 constituted by a prism 20 having four sides 22, as illustrated in FIG. 2b, the scanning pattern 3 of FIG. 2a has four divisional patterns with each a local point of convergence 32.

Figure 3A:
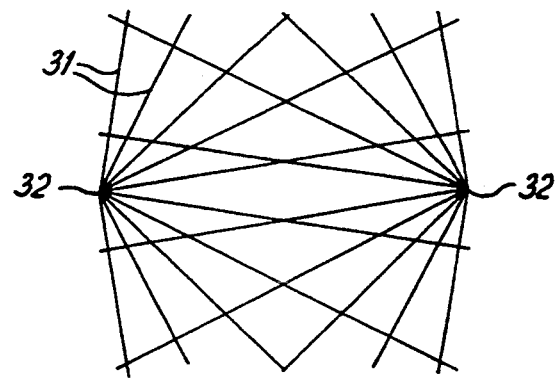
FIG. 3a and 3b show another scanning pattern of the bar code scanner according to the invention and a prism used in the pattern divider to produce this pattern.
Figure 3B:
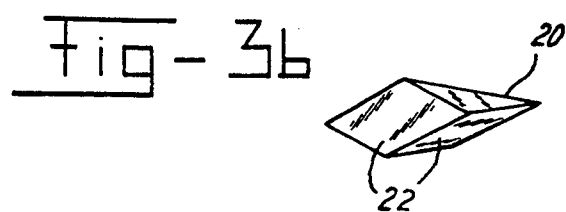

FIG. 3a shows a scanning pattern 3 having two constituent or divisional patterns, this pattern being produced with a pattern divider as shown in FIG. 3b. The pattern divider 2 of FIG. 3b is constituted by a prism 20 having two slanting sides or faces 22. As the original pattern for producing this altered pattern 3 is star-shaped, the pattern 3 of FIG. 3a has two local points of convergence 32. Due to the structure of the prism 20 of FIG. 3b, the local points of convergence 32 of the pattern 3 illustrated in FIG. 3a are located peripherically. It will be obvious that other second or altered patterns can be produced by using a prism 20 having another number of faces 22, such as three, five or eight faces 22.

Figure 4A:
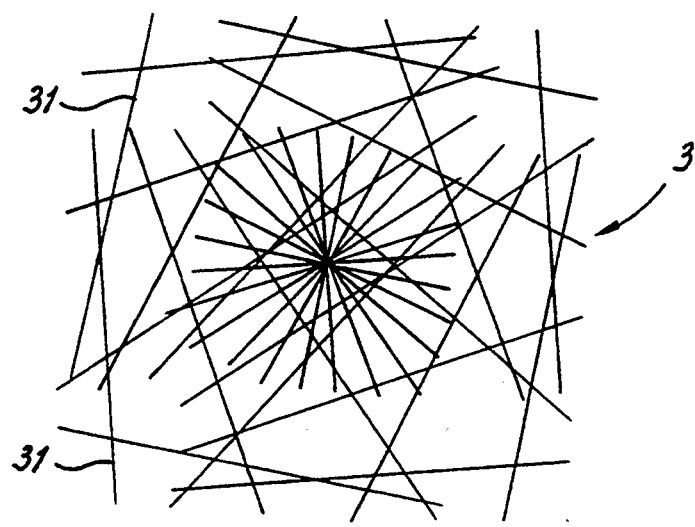
FIG. 4a and 4b show still another scanning pattern of the bar code scanner according to the invention and a prism used in the pattern divider to produce this pattern.
Figure 4B:
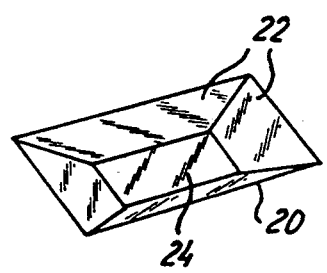

FIG. 4a shows in top view an altered and improved scanning pattern 3 produced by means of a pattern divider 2 comprising a prism 20 as depicted in FIG. 4b. The prism 20 of FIG. 4b has four slanting faces 22 and one face 24 substantially parallel with its base 21. Due to this particular structure, the central part of the first scanning pattern projected onto this prism 20 will be not be divided but will be projected directly onto the scanning plane. The peripherical parts of the original scanning pattern will, however, be divided and projected in different directions by the slanting faces 22 of the prism 20. The resulting scanning pattern 3 of FIG. 4a therefore comprises a central part with a star-shaped pattern, which is the part of the pattern which is passed directly through the face 24 of the prism 20. The scanning pattern 3 of FIG. 4a is complimented with a number of scanning lines 31 produced by the slanting faces 22 of the prism 20. There are four sets of converging lines 31, corresponding with the four slanting faces 22. As the point of convergence of the original star-shaped pattern is not divided, the converging lines of each constituent pattern do not actually meet in a single point.

The bar code scanner of FIG. 5 also comprises a scanning pattern generator 1 and a pattern divider 2. As the scanning pattern generator 1 of FIG. 5 is substantially identical to that of the FIG. 1, its description will not be repeated here. The pattern divider 2 of FIG. 5 comprises a polygon 25 and mirrors 26. The polygon 25, which has reflective faces or sides 27, deflects the incident laser beam 6 towards the mirrors 26. Each of the mirrors 26 is placed opposite a reflective face 27 of the polygon 25. Each reflective side 27 produces a divisional pattern which is directed towards the scanning plane 4 by the respective mirror 26 facing said side 27. If the rotational axis 9 intersects the apex 23 of the polygon 25, as illustrated, four local points of convergence 32 are produced in the scanning plane 4. The exact locations of the points 32 in the plane 4 depend i.a. on the tilting angles of the mirrors 26 relative to the faces 27. The polygon 25 and the mirrors 26 are held in their relative positions by means of suitable support means which are not shown for the sake of clarity of the illustration. For the same reason, the part of the laser beam 6 extending between the divider 2 and the scanning plane 4 is not shown.

The bar code scanner illustrated in FIG. 6 also comprises a scanning pattern generator 1 and a pattern divider 2. As the scanning pattern generator 1 of FIG. 6 is substantially identical to that of the FIGS. 1 and 5, its description will not be repeated here. The pattern divider 2 of FIG. 6 comprises a hologram 28 performing substantially the same function as the prism 20 or the polygon 25 of the previous figures. The hologram 28 is recorded in such a way, that it deflects the incident laser beam 6 so as to rearrange the original pattern 7 and to produce an altered or optimized pattern 3 on the scanning plane 4. With a properly chosen recording geometry, almost any deflection (dividing) action can be realized.

Figure 7:
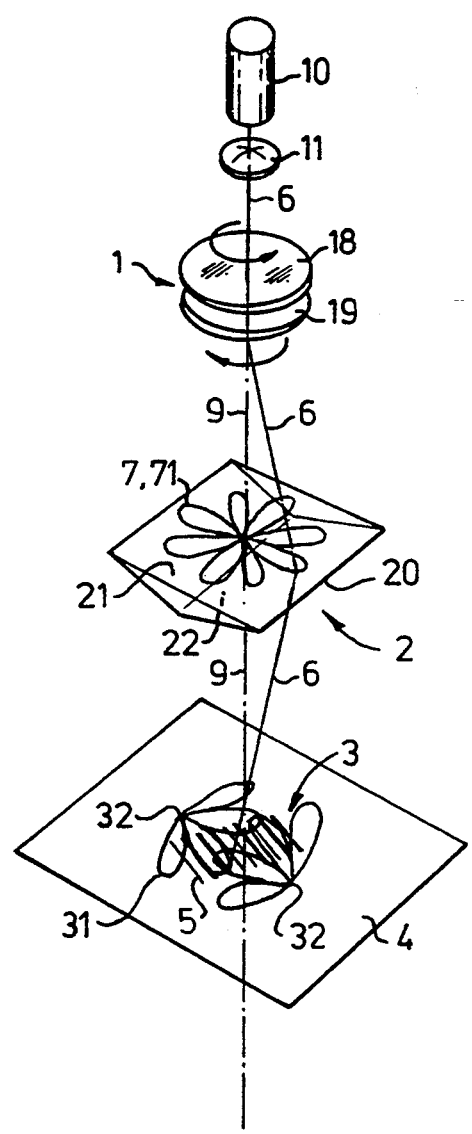
FIG. 7 shows a fourth embodiment of a bar code scanner according to the invention in which the pattern generator is constituted by rotating wedges.

The bar code scanner according to the invention illustrated in FIG. 7 also comprises a scanning pattern generator 1 and a pattern divider 2. Contrary to the scanner shown in the FIGS. 1, 5 and 6, the scanning pattern generator 1 shown in FIG. 7 comprises, in addition to a laser source 10 and focusing optics 11, rotatable wedges (triangular prisms) 18 and 19. Their rotational axis 9 substantially coincides with the laser beam 6 incident upon the wedge 18. The wedges 18 and 19 are rotated by suitable drive means (not shown), such as described in European Patent Application 91203364.4. Preferably, the wedges 18 and 19 rotate in opposite directions with a slight difference in speed. The pattern divider 2 of FIG. 7 comprises a prism 20 having two slanting faces 22, resulting in a pattern 3 having two constituent patterns. It will be understood that a prism 20 having e.g. four slanting faces 22 can also be used. Due to the slant of the faces 22, the laser beam 6 passing through the prism 20 will be directed away from the center of the prism 20, resulting in two divisional patterns in the scanning plane 4. The resulting pattern 3 has two local points of convergence 32. The rotatable wedges 18 and 19 may be replaced by two mirrors (not shown) which are rotatable in opposite directions.

The bar code scanner illustrated in FIG. 8 also comprises a scanning pattern generator 1 and a pattern divider 2, the scanning pattern generator 1 being a modified version of the generator 1 of the FIGS. 1, 5 and 6. The scanning pattern generator 1 of this particular embodiment also comprises a laser source 10 and focusing means 11, which produce a laser beam 6. The laser beam 6 is projected axially onto a slanted mirror 14 connected to the shaft 12 of drive means 13. During operation, the mirror 14 rotates and deflects the incident laser beam 6 to the mirrors 15. The mirrors 15 are tilted relative to the rotational axis 9 of the drive means 13 so as to redirect the incident laser beam 6 out of the plane of the array towards the pattern divider 2, that is upwards in the embodiment of FIG. 8. The pattern divider 2 is in this embodiment constituted by a number of mirrors 29 which are located above the array of mirrors 15. The laser beam 6 reflected by a mirror 15 will be reflected again by a mirror 29 so as to be directed towards the scanning plane 4. In the embodiment shown in FIG. 8, there are four mirrors 29 resulting in a scanning pattern 3 having four constituent scanning patterns.

In order to produce fan-shaped divisional scanning patterns, which form a scanning pattern 3 having peripheral local points of convergence 32, the mirrors 15 of the array shown in FIG. 8 have a configuration which is different from the one shown in the FIGS. 1, 5 and 6. As is illustrated schematically in FIG. 9, the mirrors 15 of the scanning pattern generator 1 shown in FIG. 8 constitute a polygonal or approximately annular array, which is substantially centered around the rotational axis 9 of the drive means 13. Contrary to the arrays shown in the previous figures, each mirror 15 does not extend beyond its edge 17 located on the respective radius 18 of the array. The line of intersection of each mirror 15 and the plane of FIG. 9 is in the illustrated embodiment perpendicular to the respective radius 18 on which the side edge 17 is located, as is shown in FIG. 9. The laser beam 6 directed by the mirror 14 (not shown) from a point 61 on the axis 9 towards a mirror 15 in e.g. the first quadrant (I) will be deflected by this mirror 15 in a point 62 (cf. FIG. 8). Due to the tilt of the mirror 15 relative to the plane of the array, which tilt is not illustrated in FIG. 9 for the sake of clarity, the laser beam 6 is deflected upwards to a mirror 29 (not shown) located above this quadrant (I). If the mirror 29 were positioned directly above and parallel with the array of mirrors 15, i.e. parallel with the plane of FIG. 9, the laser beam 6 would be reflected by the mirror 29 at e.g. a point 63 and impinge upon the scanning plane at a point 64 in the fourth quadrant (IV.I). That is, a line produced by a mirror 15 in a certain quadrant is projected on the scanning plane in the next quadrant. As the angle between a radius 18 and the part of the laser beam 6 extending between the points 61 and 62 varies due to the rotation of the mirror 14 (not shown), a scanning line 31 is drawn by the point 64. In the example illustrated in FIG. 9, the scanning line 31 coincides with a radius 18. Due to the fact that the mirrors 15 are "half mirrors" being substantially perpendicular to their respective radius 18 on which their edge 17 is located, one end of each scanning line 31 coincides with the point 61. That is, the scanning lines 31 do not continue beyond the axis 9 but extend on one side of the axis 9 only. This results in a star-shaped pattern being produced, the scanning lines 31 of the pattern converging on (and meeting in) the axis 9.

Figure 10A:
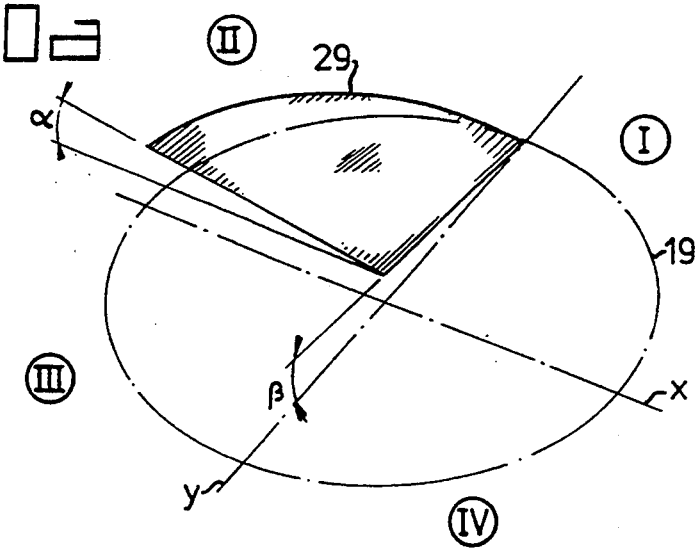
FIG. 10a, 10b, 10a and 10d show schematically the way divisional scanning patterns are relocated by means of the pattern divider of FIG. 8.
Figure 10B:
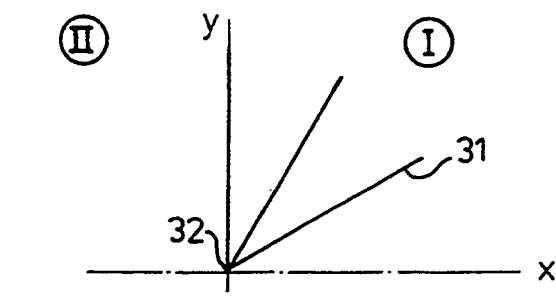
Figure 10C:
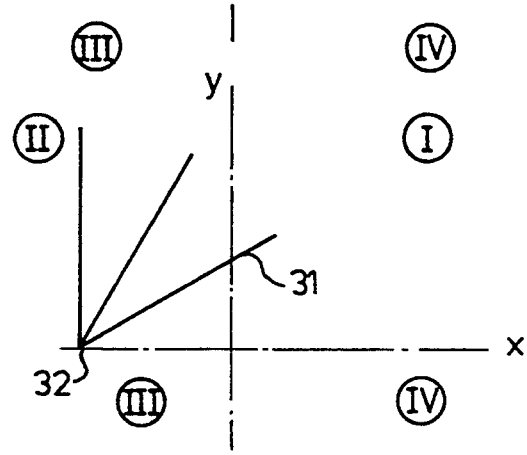
Figure 10D:
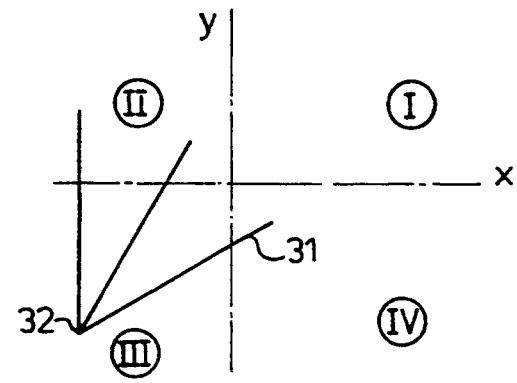

In order to divide and rearrange the thus produced star-shaped scanning pattern, the mirrors 29 of the pattern divider 2 are tilted relative to the plane of the array of mirrors 15, as is schematically illustrated in FIG. 10a. In FIG. 10a, a mirror 29 located in the second quadrant (II), is shown in perspective. The circle 19 schematically indicates the position of the array of mirrors 15. FIG. 10b shows a scanning pattern produced by three mirrors 15 (not shown) located underneath the mirror 29, i.e. also in the second quadrant (II). As will be clear from the explanation given above, the scanning lines 31 will be projected in the next, i.e. in the first quadrant (I), as is illustrated in FIG. 10b. By tilting the mirror 29 over angle α, as indicated in FIG. 10a the scanning pattern is shifted from the first quadrant (I) to the second quadrant (II), as is illustrated in FIG. 10c. By further tilting the mirror 29 over an angle α, as is also indicated in FIG. 10a, the scanning pattern is further shifted from the second quadrant (II) to the third quadrant (III), as is illustrated in FIG. 10d. That is, the fan-shaped pattern is shifted to the opposite quadrant, namely from I to III. Similarly, the pattern originally projected in the fourth quadrant (IV) can be shifted to the second quadrant (II) by appropriately tilting the mirror 29 located above the first quadrant (I), etc. By suitably tilting the mirrors covering all four quadrants, the pattern 3 of FIG. 8 and of FIG. 2a is formed, having four peripherical local points of convergence 32.

The angles α and β can be relative small, e.g. 10°, and both depend on the particular configuration and the distance between the mirrors 29 and the array of mirrors 15. The line 19, which schematically represents the array of mirrors 15, is here shown to touch each mirror 29 in one point. The actual mirrors 15 may, however, be spaced apart from the mirrors 29. Preferably, the facing edges of adjacent mirrors 29 are close or even touching, so that virtually no gap is left between the mirrors 29.

Figure 11:
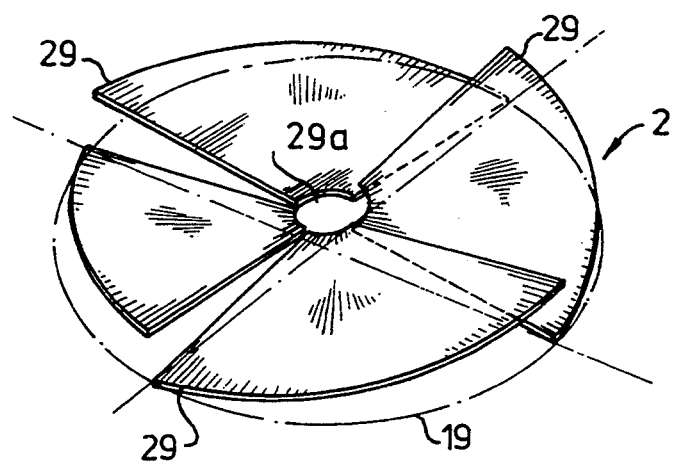
FIG. 11 shows in perspective the pattern divider of FIG. 8.

FIG. 11 shows in perspective the resulting arrangement of the mirrors 29, each mirror 29 being tilted so as to redirect part of the scanning pattern to another quadrant. The mirrors 29 are preferably shaped in such a way that an opening 29a is created for passing the laser beam 6. The illustrated mirrors 29 have the shape of a sector of a circle. Another shape, e.g. rectangular, may also be possible.

In FIGS. 8-11 the pattern divider 2 is shown to consist of four mirrors 29, which cooperate with twelve mirrors 15 to create a scanning pattern (3). It will be understood that the number of mirrors 29 and 15 can be varied, such as 24 or 36 mirrors 15 in combination with four mirrors 29, resulting in a larger number of scanning lines. Preferably, the ratio of mirrors is a whole number, such as 12/4 (as in FIGS. 8-11), 24/4 or 32/4. Of course, another number of mirrors 29 can also be used resulting in a ratio of e.g. 18/3, 36/3, 15/5, 25/5. This particular embodiment allows straight scanning lines to be produced.

Instead of the "half mirrors" shown, which have one edge on and are substantially perpendicular to their respective radius, full mirrors can of course also be used, resulting in divisional patterns having intersecting scanning lines extending beyond their points of the convergence. This allows the pattern divider of the FIGS. 8-11 to be used in conjunction with an existing scanning pattern generator.

In the illustrated embodiments of the inventive bar code scanner the pattern divider 2 is shown as being stationary relative to the pattern generator 1 and the scanning plane 4. A further improvement of the performance of the scanner may be obtained by rotating the pattern divider 2 relative to the scanning plane 4.

It will be understood that various changes can be made in the embodiments described above without departing from the spirit and scope of the present invention.

I claim:

1. A bar code scanner, comprising:
   a laser source for providing a laser beam;
   deflecting means for deflecting said laser beam, said deflecting means being rotatable around an axis of rotation substantially coinciding with the laser beam and being arranged to deflect said laser beam into a 360° scanning field;
   a scanning pattern generator set up to receive said deflected laser beam from said deflecting means in said 360° scanning field to generate a first scanning pattern comprising several non-overlapping scanning lines in a first scanning plane;
   a pattern divider for intercepting and dividing at least part of the pattern generated by the pattern generator into at least two divisional patterns and for projecting the divisional patterns in a second scanning plane so as to form an altered scanning pattern, in which at least some divisional patterns projected in the second scanning plane overlap each other.

2. The bar code scanner according to claim 1, wherein said deflecting means comprises a rotatable first mirror and said scanning pattern generator comprises a circular shaped mirror array to receive the laser beam reflected by said first mirror and a rotatable second mirror arranged to receive and reflect the laser beam reflected by said circular shaped mirror array.

3. The bar code scanner according to claim 2, wherein said pattern divider comprises a prism.

4. The bar code scanner according to claim 3, wherein said prism has a substantially flat base surface which coincides with the first scanning plane.

5. The bar code scanner according to claim 4, wherein said prism is pyramid shaped, the base surface of which being orientated perpendicular to the impinging laser beam which produces said first scanning pattern on said base surface.

6. The bar code scanner according to claim 5, wherein said prism is flat-topped.

7. The bar code scanner according to claim 4, wherein said prism comprises two slanting faces intersecting the base surface, the base surface being orientated perpendicular to the impinging laser beam which produces said first scanning pattern on said base surface.

8. The bar code scanner according to claim 2, wherein said pattern divider comprises a fixed hologram.

9. The bar code scanner according to claim 1, wherein said deflecting means comprises a first rotatable wedge and said scanning pattern generator comprises a second rotatable wedge.

10. The bar code scanner according to claim 2, wherein said pattern divider comprises a first pyramid shaped mirror means having a predetermined number of facets arranged to receive said first scanning pattern generated by said scanning pattern generator and a set of further mirrors arranged to receive the laser beam reflected by said pyramid shaped mirror means and the numbers of which equals the number of said facets.

11. The bar code scanner according to claim 10, wherein said deflecting means comprises a first rotatable wedge and said scanning pattern generator comprises a second rotatable wedge.

12. The bar code scanner according to claim 1, wherein said deflecting means comprises a rotatable first mirror and said scanning pattern generator comprises a circular shaped mirror array to receive the laser beam reflected by said first mirror and wherein said pattern divider comprises several mirror facets to receive the laser beam reflected by said circular shaped mirror array and each arranged in such a way that they are each tilted slightly relative to said first scanning plane.

* * * * *